United States Patent [19]

Bernstein

[11] Patent Number: 5,534,272
[45] Date of Patent: Jul. 9, 1996

[54] APPETITE SUPPRESSANT CHEWING GUM CONTAINING CHROMIC PICOLINATE

[75] Inventor: Richard Bernstein, Toluca, Calif.

[73] Assignee: Bernstein Brothers Marketing Corp., Burbank, Calif.

[21] Appl. No.: 368,213

[22] Filed: Jan. 3, 1995

[51] Int. Cl.⁶ ..................................................... A23G 3/30
[52] U.S. Cl. ..................................................... 426/3
[58] Field of Search ................................. 426/3-6, 72

[56] References Cited

U.S. PATENT DOCUMENTS

| | | | |
|---|---|---|---|
| 2,631,119 | 3/1953 | Ferguson | 426/3 |
| 5,013,752 | 5/1991 | Dobbins | 514/505 |
| 5,087,623 | 2/1992 | Boynton et al. | 514/188 |
| 5,087,624 | 2/1992 | Boynton et al. | 514/188 |

*Primary Examiner*—Jeanette Hunter
*Attorney, Agent, or Firm*—Ostrolenk, Faber, Gerb & Soffen

[57] ABSTRACT

A chewing gum containing an appetite suppressant quantity of chromic picolinate.

3 Claims, No Drawings

APPETITE SUPPRESSANT CHEWING GUM CONTAINING CHROMIC PICOLINATE

BACKGROUND OF THE INVENTION

The present invention relates to an appetite suppressant, and more specifically to a chewing gum containing an appetite suppressant quantity of chromic picolinate.

Chewing gums containing various flavors and additives are known. However, a chewing gum containing an appetite suppressant quantity of chromic picolinate is not presently available.

SUMMARY OF THE INVENTION

In accordance with the invention, an appetite suppressant quantity of chromic picolinate is contained in a chewing gum base. When the chewing gum is chewed, the chromic picolinate is sublingually assimilated and functions as an effective appetite suppressant.

Other features and advantages of the present invention will become apparent from the following description of the invention which refers to the accompanying drawings.

DETAILED DESCRIPTION OF THE INVENTION

The chewing gum of the present invention includes a sufficient quantity of chromic picolinate to suppress appetite. The chromic picolinate containing chewing gum is convenient and effective in providing an appetite suppressant quantity of chromic picolinate. It is easy for a person to carry and use. Since the chromic picolinate is sublingually assimilated it is effective and provides fast relief. Furthermore, the chromic picolinate is contained in the chewing gum base and, therefore, release during chewing is gradual for an extended period of time. Larger quantities of the chromic picolinate can be provided with gradual assimilation during the chewing period.

In general, therefore chromic picolinate may be added in an amount from about 4 to 10 wt % of the chewing gum base. Preferably, chromic picolinate is added in an amount from 7 to 9 wt % of the chewing gum base.

In general, a chewing gum composition comprises a water-soluble bulk portion containing the chromic picolinate and other additives, a water-insoluble chewable gum base portion, and typically water-insoluble flavor. The water-soluble bulk portion dissipates with a portion of the flavor over a period of time during chewing. The water-insoluble gum base is retained in the mouth throughout the chewing period.

The water-insoluble gum base generally comprises elastomers, resins, fats and oils, waxes, softeners and inorganic fillers. Generally, elastomers are present in an amount from about 10–30 wt % of the chewing gum base, and may include polyisobutylene, isobutylene-isoprene copolymer, styrene-butadiene rubber, as well as natural latexes such as chicle. Generally, resins are present in an amount from about 15–30 wt % of the chewing gum base, and may include polyvinyl acetate and terpene resins. Generally, fats and oils may also be included in an amount from about 15–40 wt % of the gum base, and include tallow, hydrogenated and partially hydrogenated vegetable oils and cocoa butter. Often, waxes are present in an amount from about 0.1–15 wt % of the gum base, and may include paraffin wax, microcrystalline wax, and natural waxes such as beeswax and carnauba.

The gum base typically also includes a filler component. The filler component may be calcium carbonate, magnesium carbonate, talc, dicalcium phosphate and the like, as well as mixtures thereof. The filler may constitute about 5–60 wt % of the gum base. Preferably, the filler comprises about 5–50 wt % of the chewing gum base.

The gum base typically also contains softeners and emulsifiers. Softeners may comprise about 0–15 wt % of the gum base and include but are not necessarily limited to glycerol monostearate and glycerol triacetate. Emulsifiers may comprise from about 1–10 wt % of the gum base, and include but are not necessarily limited to lecithin, fatty acid monoglycerides, triglycerides and the like, as well as mixtures thereof. Further, the gum base may also contain optional ingredients such as antioxidants, colors and pharmaceutical agents.

Generally, the insoluble gum base constitutes between about 5–95 wt % of the gum. Preferably, the insoluble gum base comprises about 10–50 wt % of the gum, and more preferably, about 20–30 wt %.

The water-soluble portion of chewing gum may comprise softeners, sweeteners, flavors and combinations thereof. The softeners are added to the chewing gum in order to optimize the chewability and mouthfeel of the gum. Softeners, also known in the art as plasticizers or plasticizing agents, generally constitute between about 0.1–15 wt % of the chewing gum. Softeners contemplated for use in the water-soluble portion of the chewing gum include glycerin, lecithin, and combinations thereof. Further, aqueous sweetener solutions such as those containing sorbitol, hydrogenated starch hydrosylates, corn syrups and combinations thereof may be used as softeners and binding agents in the gum.

Sweeteners contemplated for use in chewing gum include both sugar and sugarless components. Sugar sweeteners generally include saccharide containing components, commonly known in the chewing gum art and which include but are not necessarily limited to sucrose, dextrose, maltose, dextrin, dried invert sugar, fructose, levulose, galactose, corn syrup solids and the like, alone or in any combination. Sugarless sweeteners generally include components with sweetening characteristics that are devoid of the commonly known sugars, and include but are not necessarily limited to sugar alcohols such as sorbitol, xylitol, hydrogenated starch hydrosylates, maltitol and the like, alone or in any combination. Also contemplated for direct addition to the gum are relatively faster releasing, high-intensity sweeteners such as aspartame, sucralose, acesulfame-K, alitame and saccharin. High intensity sweeteners may comprise up to about 0.6 wt % of the chewing gum.

Those skilled in the art will recognize that any combination of sugar and/or sugarless sweeteners may be employed in the chewing gum. Further, those skilled in the art will recognize a sweetener may be present in a chewing gum in whole or in part as a water-soluble bulking agent. In addition, a softener can be combined with a sweetener such as an aqueous sweetening solution.

Chewing gum also contains flavor. Generally, flavor is present in chewing gum from about 0.1–10 wt %, and preferably from about 0.5–3 wt % of the gum. Flavors contemplated by the present invention include any liquid flavoring which is of food acceptable quality. Such flavors may consist of essential oils, synthetic flavors, and mixtures thereof, including but not necessarily limited to oils derived from plants and fruits such as citrus fruits, fruit essences, peppermint oil, spearmint oil, clove oil, oil of wintergreen, anise, and the like. Artificial flavoring components are also contemplated by the present invention. Those skilled in the art will recognize that the natural and artificial flavors can be combined in any manner. Optional ingredients such as colors, emulsifiers, and pharmaceutical agents may be added to the chewing gum.

In general, chewing gum is manufactured by sequentially adding the various chewing gum ingredients to any mixer known in the art. After the ingredients have been thoroughly mixed, the gum mass is discharged from the mixer and shaped into the desired form such as by rolling it into sheets and cutting it into sticks, extruding it into chunks, or casting into pellets. Generally, the ingredients are mixed by first melting the gum base and adding it to the running mixer. The base may also be melted in the mixer itself. Color may also be added at this time. A softener such as glycerin may then be added next along with the syrup and a portion of the bulking agent. Further portions of the bulking agent may then be added to the mixture. It should be understood that the chromic picolinate may be added at any time during the gum manufacturing process.

The entire mixing process typically takes from about 5 to about 15 minutes, but longer mixing times may sometimes be required.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An appetite suppressant, comprising: a chewing gum base; and an appetite suppressant quantity of chromic picolinate.

2. The appetite suppressant of claim 1, wherein the appetite suppressant quantity of chromic picolinate is 4 to 10 wt % of the chewing gum base.

3. The appetite suppressant of claim 2, wherein the appetite suppressant quantity of chromic picolinate is 7 to 9 wt % of the chewing gum base.

* * * * *